(12) United States Patent
Lu

(10) Patent No.: US 7,733,334 B2
(45) Date of Patent: *Jun. 8, 2010

(54) HIDDEN TOUCH PAD STRUCTURE

(75) Inventor: Ying-Ta Lu, Taipei (TW)

(73) Assignee: First International Computer Inc., Taipei (TW)

( * ) Notice: Subject to any disclaimer, the term of this patent is extended or adjusted under 35 U.S.C. 154(b) by 592 days.

This patent is subject to a terminal disclaimer.

(21) Appl. No.: 11/624,901

(22) Filed: Jan. 19, 2007

(65) Prior Publication Data

US 2007/0114115 A1      May 24, 2007

Related U.S. Application Data

(63) Continuation of application No. 10/792,845, filed on Mar. 5, 2004, now Pat. No. 7,167,163.

(51) Int. Cl.
*G09G 5/00* (2006.01)

(52) U.S. Cl. .................. 345/173; 345/175; 345/176; 178/18.03; 178/18.11; 348/14.03; 463/37; 362/26; 362/29; 362/600

(58) Field of Classification Search .............. 345/173, 345/175, 176, 178, 901, 905; 178/18.03, 178/18.08–18.11; 348/14.03; 362/26, 29, 362/600; 463/37
See application file for complete search history.

(56) References Cited

U.S. PATENT DOCUMENTS

| 5,736,686 | A | 4/1998 | Perret, Jr. et al. |
| 6,788,295 | B1 | 9/2004 | Inkster |
| 6,933,929 | B1 | 8/2005 | Novak |
| 6,956,561 | B2 | 10/2005 | Han |
| 7,167,163 | B2 | 1/2007 | Lu |
| 7,499,040 | B2 * | 3/2009 | Zadesky et al. .............. 345/204 |
| 2003/0227766 | A1 | 12/2003 | Hom et al. |

* cited by examiner

*Primary Examiner*—Henry N Tran
(74) *Attorney, Agent, or Firm*—Alan Kamrath; Kamrath & Associates PA

(57) ABSTRACT

A hidden touch pad structure adapted for an electronic product has a plate, a touch pad arranged inside the plate, a circuit board disposed under and retained against the plate and the touch pad simultaneously, and a lighting device surrounding the touch pad and received inside the plate. The circuit board receives a pressure signal via the plate and the touch pad and drives the lighting device to provide light. The touch pad is recognized via the lighting device surrounding the touch pad.

13 Claims, 2 Drawing Sheets

HIDDEN TOUCH PAD STRUCTURE

CROSS-REFERENCE

This application is a continuation of U.S. patent application Ser. No. 10/792,845 filed on Mar. 5, 2004, now U.S. Pat. No. 7,167,163, which is incorporated herein by reference in its entirety.

BACKGROUND OF THE INVENTION

1. Field of the Invention

The present invention relates to a touch pad and, particularly, relates to a hidden touch pad structure adapted for an electronic product.

2. Background of the Invention

With respect to FIG. 1 and FIG. 1A, a conventional laptop 1a with a touch pad 2a includes a base 10a, a cover 11a pivoted on an edge of the base 10a and a plate 12a disposed on an upper surface of the base 10a. The touch pad 2a is arranged between the plate 12a and the base 10a and is partially revealed via a window formed in the plate 12a. The window in plate 12a is configured corresponding to the touch pad 2a. The plate 12a has a pressing member 121a inwardly extending from an outline of the window to press and retain against the touch pad 2a. The touch pad 2a has a lower surface aligned with that of the plate 12a for connecting a circuit board 3a arranged thereunder. The touch pad 2a electrically connects the circuit board 3a, and the exposed part of the touch pad 2a can sense a user's finger effectively via the circuit board 3a to transfer and transmit signals therefrom. Generally speaking, the plate 12a has a thickness of between 3 mm and 4 mm, greater than that of the touch pad 2a. To avoid height differences between the plate 12a and the touch pad 2a influencing the feeling of a user's finger, the pressing member 121a has a smoothing surface 122a formed on a free end thereof. The smoothing surface 122a includes a graded curvature for smooth touching. However, the plate 12a with the window, the pressing member 121a and the smoothing surface 122a are manufactured by multiple steps, so as to increase costs and to reduce manufacturing efficiency. Furthermore, the pressing member 121a may be improperly long and reduce the size of the exposed part of the touch pad 2a. The pressing member 121a may be improperly thick to increase the height differences between the touch pad 2a and the plate 12a. The smoothing surface 122a of plate 12a is made within a small length of the pressing member 121a, and complicated steps are needed. Accordingly, designs of the smoothing surface 122a of the pressing member 121a are made carefully, and manufacturing apparatus must be accurate and precise.

In addition, referring back to FIG. 1A, the touch pad 2a is opened up for use. A periphery adjacent to the pressing member 121a of the plate 12a is easily covered with and the exposed part of the touch pad 2a is stained with oil from a user's finger. Both are difficult to clean and, thus, affect the long term life of the electronic product.

Hence, an improvement over the prior art is required to overcome the disadvantages thereof.

SUMMARY OF INVENTION

The primary object of the invention is therefore to specify a hidden touch pad structure adapted for an electronic product, in which a plate thereof has a recess formed integrally in one piece to omit other processes and high-precision apparatuses for simplifying steps and reducing costs.

The secondary object of the invention is therefore to specify a hidden touch pad structure adapted for an electronic product, in which the touch pad is hidden under the plate to avoid exposing the touch pad, to avoid maintenance and to avoid reduced product life.

The third object of the invention is therefore to specify a hidden touch pad structure adapted for an electronic product, in which the touch pad is recognized by a lighting device.

The fourth object of the invention is therefore to specify a hidden touch pad structure adapted for an electronic product in which the lighting device strengthens characteristics of a product and builds up a specific brand image, both for commercial trade.

According to the invention, this object is achieved by a hidden touch pad structure adapted for an electronic product. A touch pad is arranged inside the plate. A circuit board is disposed under and retained against the plate and the touch pad simultaneously. A lighting device surrounds the touch pad and is received inside the plate. The circuit board receives a pressure signal via the plate and the touch pad and drives the lighting device to provide light, and the touch pad is recognized via the lighting device surrounding the touch pad.

To provide a further understanding of the invention, the following detailed description illustrates embodiments and examples of the invention. Examples of the more important features of the invention have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

These and other features, aspects, and advantages of the present invention will become better understood with regard to the following description, appended claims, and accompanying drawings, where:

DETAILED DESCRIPTION OF THE EMBODIMENTS

Figure 1:
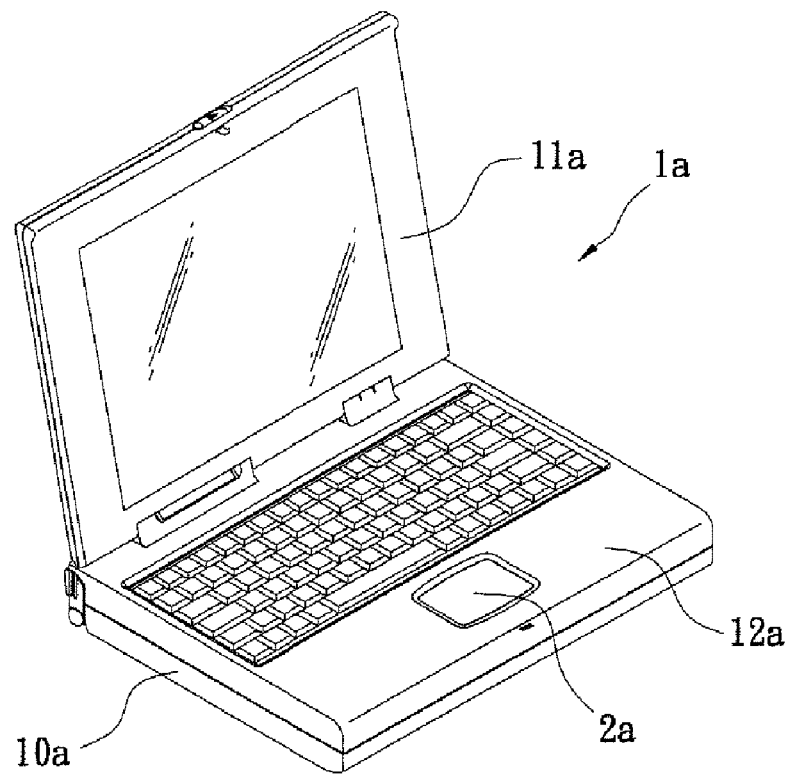
FIG. 1 is a perspective view of a conventional laptop with a touch pad.
Figure 1A:
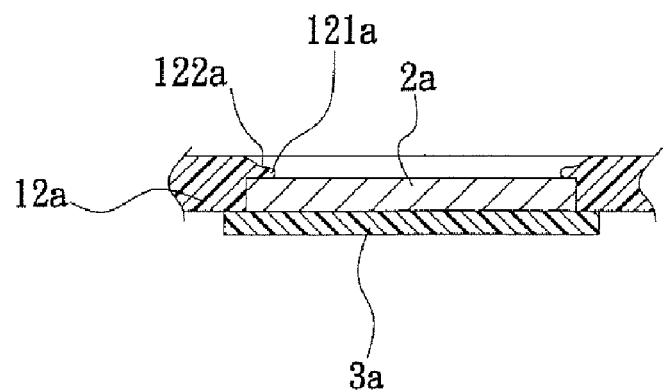
FIG. 1A is a cross-sectional profile of the touch pad adapted for the conventional laptop.
Figure 2:
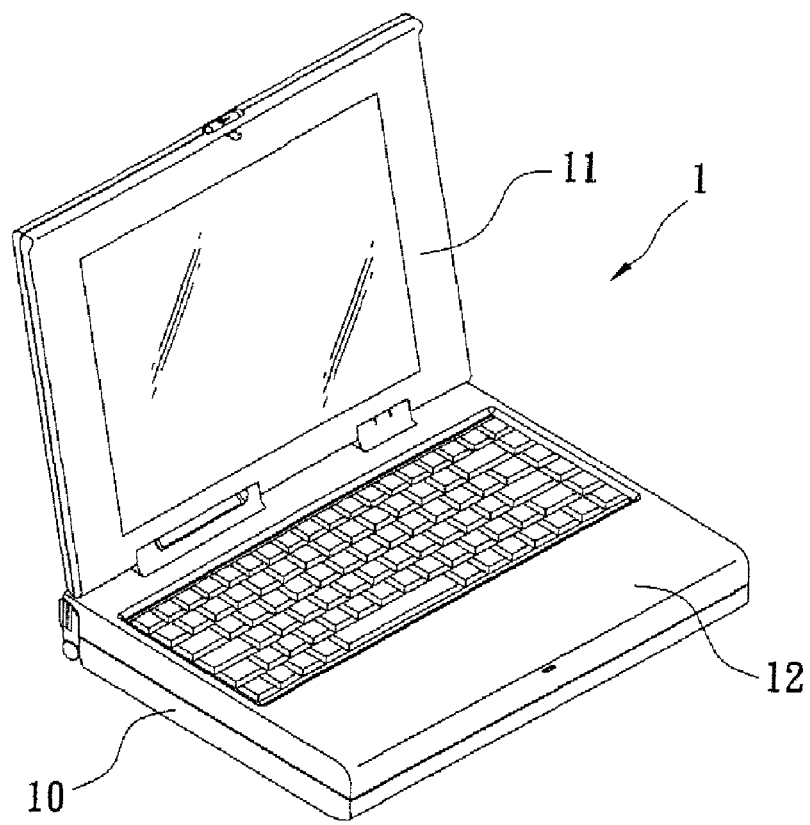
FIG. 2 is a perspective view of a hidden touch pad structure according to the present invention.
Figure 2A:
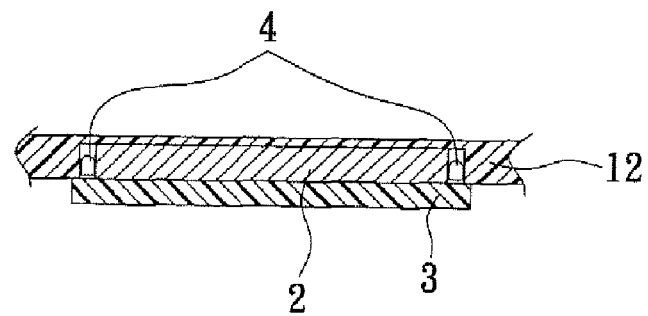
FIG. 2A is a cross-sectional profile of the hidden touch pad structure according to the present invention.

With respect to FIG. 2 and FIG. 2A, the present invention provides a hidden touch pad structure adapted for an electronic product. The electronic product may be a notebook 1, which includes a base 10 and a cover 11 pivoted to an edge of the base 10. The hidden touch pad structure includes a plate 12 disposed on an upper surface of the base 10. A touch pad 2 is arranged inside the plate 12. A circuit board 3 is disposed under and retained against the plate 12 and the touch pad 2 simultaneously. A lighting device 4 surrounds the touch pad 2 and is received inside the plate 12. The touch pad 2 and the lighting device 4, respectively, electrically connect to the circuit board 3, whereby the circuit board 3 receives a pressure signal via the plate 12 and the touch pad 2 and drives the lighting device 4 to provide light. The touch pad 2 is recognized via the lighting device 4 surrounding the touch pad 2. The plate 12 includes a recess concaved from a bottom surface thereof with a predetermined depth. The recess is formed with the plate 12 integrally in one piece, and the touch pad 2 is disposed in the recess of the plate 12 to omit other processes and high-precision apparatuses in the conventional process for simplifying steps and reducing costs.

The predetermined depth of the recess approaches a thickness of the touch pad 2. The touch pad 2 has a top surface retained against an inner surface and adjacent to the recess of the plate 12 thereby. The touch pad 2 contacts the plate 12 well, and accordingly, to press the plate 12 is equivalent to pressing the touch pad 2. In addition, the plate 12 is originally flat and smooth and needs no further smoothing processes for a smooth feeling. Simultaneously, the plate 12 encloses the touch pad 2 to protect substantially the touch pad 2 and avoid reduced product life due to pollution. The lighting device 4 electrically connects to the circuit board 3, and the circuit board 3 receives the pressure signal via the plate 12 and the touch pad 2. The circuit board 3 drives the lighting device 4 to provide light. The touch pad 2 is recognized via the lighting device 4 surrounding the touch pad 2. The lighting device 4 is amusing for a user. The lighting device 4 includes a lighting member or a guiding member. The lighting device 4 includes a plurality of LEDs (Light Emitting Diode) surrounding sequentially, or the lighting device 4 includes a LED and a guide light strip. Therefore, the lighting device 4 is lightweight, saves power, and has a long life. The hidden touch pad structure according to the present invention contains the touch pad 2 therein due to a various thickness of the plate 12, so as to decrease manufacturing steps. The hidden touch pad structure can be fabricated in a modular manner to improve manufacturing efficiency for all kinds of electronic products. Furthermore, the touch pad 2 is hidden beneath the plate 12 for simplifying visual impressions and providing a smooth touch via the plate 12 and is beneficial for strengthening characteristics of a product and building up a specific brand image, both for commercial trade.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A hidden touch pad structure adapted for an electronic product including a keyboard, comprising:
    a plate comprising an area adjacent to the keyboard, with the area of the plate originally integrally formed in one piece and including a top surface, with the top surface being continuous, flat and smooth;
    a touch pad arranged under the plate;
    a circuit board disposed under and retained against the plate and the touch pad simultaneously;
    wherein the touch pad electrically connects to the circuit board, wherein the circuit board receives a pressure signal via the plate and the touch pad.

2. The hidden touch pad structure as claimed in claim 1, wherein the plate has various thicknesses.

3. The hidden touch pad structure as claimed in claim 2, wherein the plate includes a recess concaved from a bottom surface of the plate with a predetermined depth to make the various thicknesses thereof, the recess is formed on the plate integrally in one piece, the recess includes an inner surface spaced from the top surface and intermediate the top surface and the bottom surface, and the touch pad is disposed in the recess of the plate, with the bottom surface being opposite to the top surface.

4. The hidden touch pad structure as claimed in claim 3, wherein the predetermined depth approaches a thickness of the touch pad.

5. The hidden touch pad structure as claimed in claim 3, wherein the touch pad has a top surface retained against the inner surface of the recess of the top plate and adjacent to the recess of the plate.

6. The hidden touch pad structure as claimed in claim 3 further comprising a lighting device surrounding the touch pad and received inside the plate and disposed in the recess with the touch plate, wherein when the circuit board receives the pressure signal via the plate and the touch pad, the circuit board further drives the lighting device to provide light, and the touch pad is recognized via the lighting device surrounding the touch pad.

7. The hidden touch pad structure as claimed in claim 6, wherein the lighting device includes a surrounding plurality of LEDs (Light Emitting Diode).

8. The hidden touch pad structure as claimed in claim 6, wherein the lighting device includes a lighting member and a guiding member connecting sequentially.

9. The hidden touch pad structure as claimed in claim 8, wherein the lighting member is an LED (Light Emitting Diode).

10. The hidden touch pad structure as claimed in claim 8, wherein the guiding member is a guide light strip.

11. A hidden touch pad structure adapted for an electronic product including a keyboard, comprising:
    a plate adapted to receive the keyboard and an area adjacent to the keyboard, with the area of the plate originally integrally formed in one piece and including a top surface, with the top surface being continuous, flat and smooth;
    a touch pad arranged under the plate;
    a circuit board disposed under and retained against the plate and the touch pad simultaneously;
    wherein the touch pad electrically connects to the circuit board, wherein the circuit board receives a pressure signal via the plate and the touch pad.

12. The hidden touch pad structure as claimed in claim 11, wherein the plate has various thicknesses, and wherein the plate includes a recess concaved from a bottom surface of the plate with a predetermined depth to make the various thicknesses thereof, the recess is formed on the plate integrally in one piece, the recess includes an inner surface spaced from the top surface and intermediate the top surface and the bottom surface, and the touch pad is disposed in the recess of the plate, with the bottom surface being opposite to the top surface.

13. A hidden touch pad structure adapted for an electronic product including a keyboard, comprising:
    a plate adapted to receive the keyboard and an area adjacent to the keyboard, with the area of the plate originally integrally formed in one piece and including a top surface, with the top surface being continuous, flat and smooth;
    a touch pad arranged under the plate;
    a circuit board disposed under and retained against the plate and the touch pad simultaneously;
    wherein the touch pad electrically connects to the circuit board;
    wherein the circuit board receives a pressure signal via the plate and the touch pad;
    wherein the plate has various thicknesses; and
    wherein the plate includes a recess concaved from a bottom surface of the plate with a predetermined depth to make the various thicknesses thereof, the recess is formed on the plate integrally in one piece, the recess includes an inner surface spaced from the top surface and intermediate the top surface and the bottom surface, and the touch pad is disposed in the recess of the plate, with the bottom surface being opposite to the top surface.

* * * * *